United States Patent Office 3,166,702
Patented Jan. 19, 1965

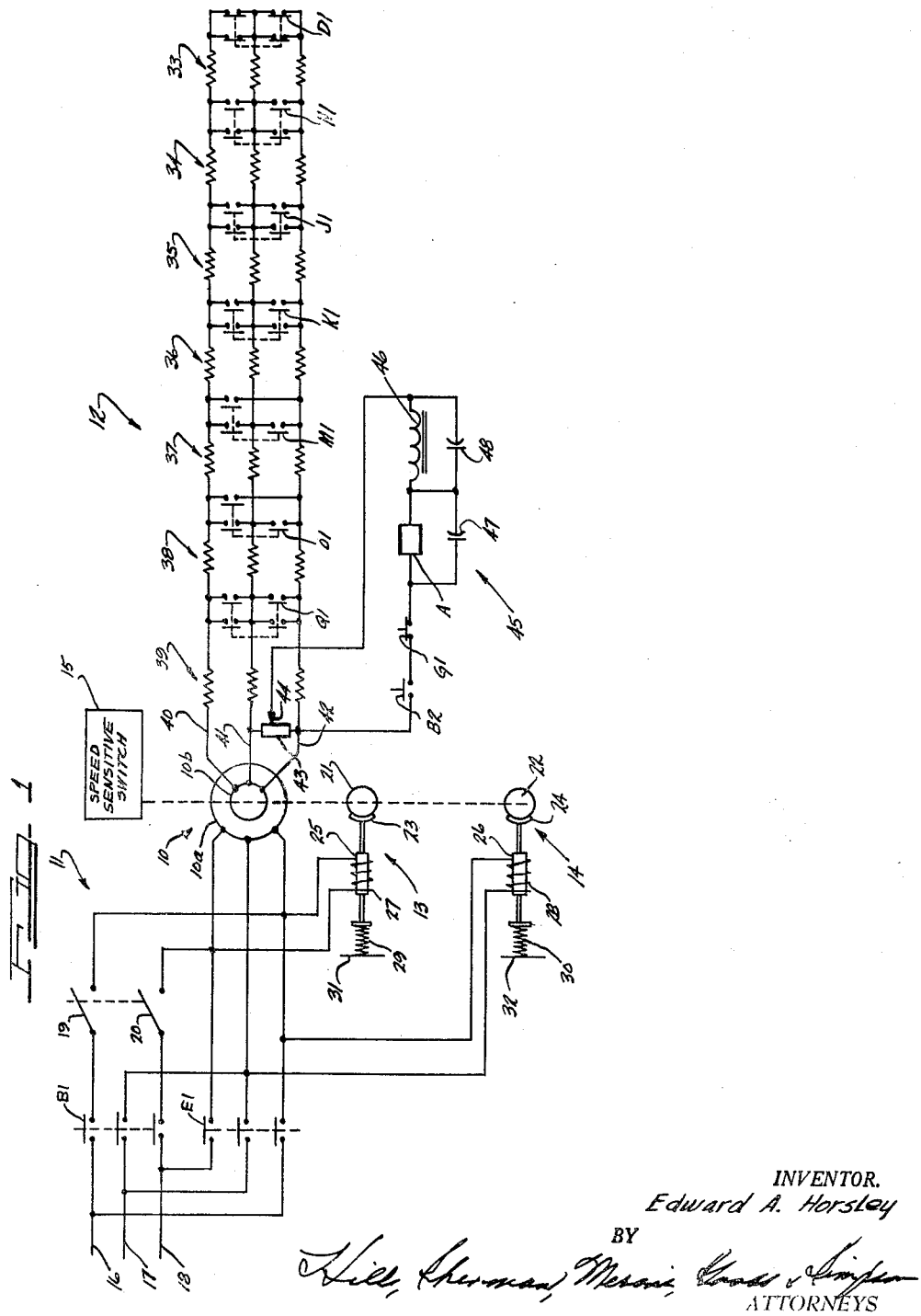

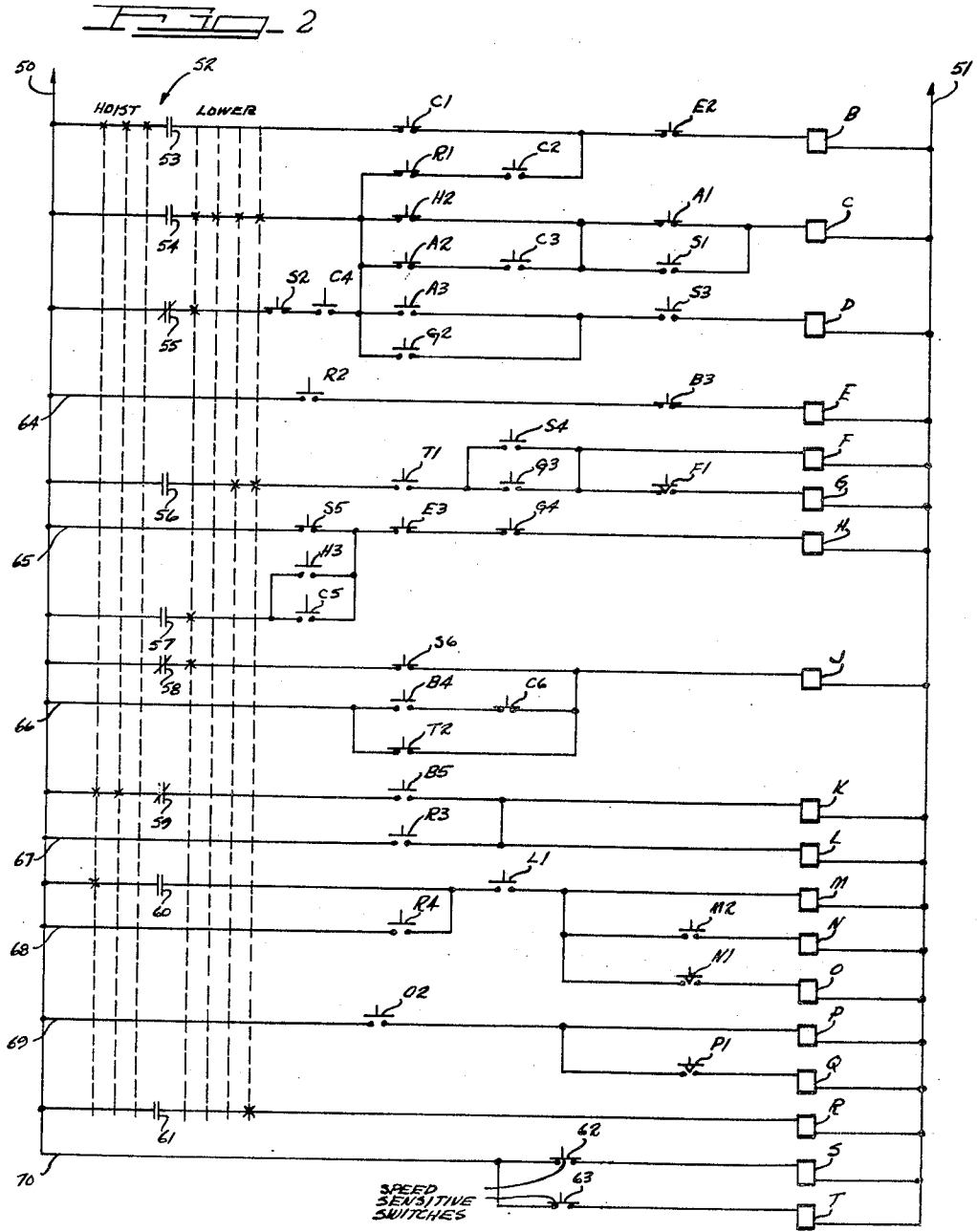

3,166,702
SPEED CONTROL FOR INDUCTION MOTOR HAVING VARIABLE RESISTANCE SECONDARY
Edward Alexander Horsley, Niagara Falls, Ontario, Canada, assignor to Provincial Engineering Ltd., Niagara Falls, Ontario, Canada, a corporation of Canada
Filed Oct. 2, 1961, Ser. No. 142,212
3 Claims. (Cl. 318—240)

This invention relates to control systems for wound rotor induction motor drives and, more particularly, to systems for controlling the speed in two directions of operation of wound rotor induction motors which are especially adapted for use in crane hoisting operations.

Cranes frequently employ a polyphase induction motor to handle hoisting operations and the motor is usually a wound rotor type that has a network of resistors and accelerating contactors connected in the rotor winding circuit. Since the torque output of the motor is determined by the current flowing in the rotor winding, it can be varied by providing a control circuit to selectively short out the resistors using the contactors.

In a control scheme using graduated hoisting torque to lower loads the amount of resistance connected into the rotor circuit and the hook load determines the direction of rotation of the hoist motor and whether the load will be hoisted or lowered. For example, if a moderate load is on the hook and very little resistance is connected into the rotor circuit a large amount of torque will be applied and the load will be hoisted if not otherwise prevented. On the other hand, if a large amount of resistance is inserted into the rotor circuit with a moderate load, very little torque will be applied and the load will probably be lowered.

It can be seen that in this sort of a system where the condition of the load in part determines the direction of rotation and the speed of the hoist motor, there is always a danger when using conventional systems that the crane operator will connect too much resistance in the rotor circuit and cause the load to lower at an excessive rate of speed and conversely too little resistance in the rotor circuit would cause a light load or empty hook to be hoisted with the master switch in a lowering position.

Accordingly, it is an object of this invention to provide a control system for a wound rotor induction motor wherein means are provided to relate the speed of the motor to its load.

It is another object of this invention to provide a control circuit having means for automatically adjusting its operation in accordance with load.

It is still another object of this invention to provide a crane hoisting motor control system which ensures that the landing speed will be in the same range for all loads.

It is still another object of this invention to provide a control system for a motor that includes a speed sensitive switch that conditions the control circuit for different loads being handled by the motor.

It is still another object of this invention to provide a crane hoist system wherein the lowering speed of the hoist motor depends upon the position of a master control, the condition of a speed sensitive switch connected in the control circuit, and the load on the crane hook.

Other objects, features and advantages of the present invention will be apparent from the following detailed description taken in conjunction with the accompanying figures of the drawings, in which:

FIGURE 1 is a schematic illustration of a power circuit for a wound rotor induction motor; and FIGURE 2 is a schematic illustration of a control circuit for the motor.

The system employed to identify the components illustrated on the drawings is as follows: Letters identify the operating coils of relays; letters followed by numbers identify relay contacts, the letters indicating the associated coils; and numbers identify the remaining components.

With reference to FIGURE 1, there is illustrated a polyphase induction motor 10 that has its primary winding 10a connected to a power supply circuit 11 and its rotor winding 10b connected to a network 12 of resistors and relay contacts, and two conventional brakes 13 and 14. It should be understood that only one brake will do.

The power supply circuit 11 includes three conductors 16, 17 and 18 which, in operation, are connected between a suitable polyphase alternating current source and the primary winding 10a of the motor 10. The power supply circuit also includes two sets of contacts B1 and E1 and two limit switches 19 and 20. The connections to the motor 10 are such that when the contacts B1 are closed the motor 10 will exert a hoisting torque and when the contacts E1 are closed the motor 10 will exert a lowering torque. The limit switches 19 and 20, are adjusted so that they will be opened automatically and disconnect the power source from the motor 10 when the hook rises to a predetermined level and the contacts B1 are closed.

The two brakes 13 and 14 may be identical and include two brake drums 21 and 22 which are mechanically coupled to the rotor of the motor 10, and two brake shoes 23 and 24. The brake shoes are connected to the plungers 25 and 26 of two solenoids which have their windings 27 and 28 connected across the conductors 16, 17 and 18. Two compression springs 29 and 30 are disposed between extensions of the plungers 25 and 26, respectively and stationary barriers 31 and 32 and urge the brake shoes 23 and 24 in the direction of the drums 21 and 22. Whenever electrical power is connected to the motor 10 the two brakes 13 and 14 are released and whenever the power is disconnected from the motor the two brakes automatically set. If direct current brakes are used suitable rectifiers should be installed in the lines leading to the solenoids.

The network 12 includes 7 sets of resistors 33–39 which are bridged by a series of normally open relay contacts H1, J1, K1, M1, O1, and Q1, and a set of normally closed contacts D1. The relays are three and four pole types of suitable sizes. Three conductors 40, 41 and 42 connect the secondary winding 10b to the network 12 and a variable resistor 43 is connected across the conductors 41 and 42. The resistor 43 has its sliding contact 44 connected to one side of a frequency sensitive circuit 45, which is designed to resonate at power line frequency, which has its other side connected to the conductor 42. The circuit 45 includes the normally open relay contacts B2, the normally closed relay contacts G1, the relay coil A, an inductor 46, and two capacitors 47 and 48. The inductor 46 and the coil A are connected in series with the contacts B2 and G1, the capacitor 48 is connected in parallel with the inductor 46, and the capacitor 47 is connected in parallel with a coil A. The operation of the frequency sensitive circuit 45 is such that the current through the relay coil A increases sharply at resonant frequency and closes its contacts when the frequency of the voltage across the resistor 43 approaches the power line frequency, which occurs when the motor 10 is nearly at standstill. Suitable values for the components in this circuit are 3 and 10 mfd. for the two capacitors and 1.3 h. for the inductor with a 1.0 h. tap. Instead of connecting the variable resistor 43 as shown, it can be connected between the line 41 and the terminal between the contacts G1 and the coil A. All other connections remain the same in this embodiment.

The speed sensitive switch 15 is coupled to the rotor of the motor 10 and has two switches which open and close in response to the speed of the motor. One type of switch that has been found suitable is described in the Product Bulletin 2210 published by Euclid Electric Mfg. Co. of Madison, Ohio, in January of 1959. This switch is a type C centrifugal switch which is effective in the range of 70 to 5000 r.p.m.

The control circuit illustrated in FIGURE 2 is adapted to operate the relay contacts in FIGURE 1 in order to apply power to the motor 10 and to vary the torque output of this motor.

This control circuit includes two lines 50 and 51 which in operation are connected to a suitable source of electric potential. The circuit also includes a master control 52 that has three hoisting points and four lowering points. This switch 52 has nine cam actuated contacts 53–61, the switches 55, 58 and 59 being normally closed when the control is in its neutral position and all of the contacts being open except at the control points marked by a cross.

The two contacts 62 and 63 of the speed sensitive switch 15 are also included in this circuit. The switch 62 is normally closed on standstill and at low speeds up to approximately 10% of maximum speed and opens on increased speeds of the motor 10. The switch 63 is normally closed when the motor 10 is operating at a safe speed and opens when the motor 10 speed rises above approximately 100% of its rated speed.

All of the points except the fourth point lower on the master control 52 can be considered hoisting points and all of the torques as hoisting torques even though the speed of the hoist motor 10 may vary from 100% in a negative direction to 100% in a positive direction. When the master control 52 is turned to the hoisting points the degree of hoisting torque is changed by inserting the resistors from the contacts J1 toward the motor into the circuit. When these contacts J1 are closed the values of the resistors are preferably chosen so that the amount of torque exerted by the motor is approximately 60% to 70% of its rated torque. If there is a heavy load on the hook the lines of the crane will tighten up but will not lift, and it is then necessary for the operator to move to the second and third hoisting points.

When the control 52 is in the neutral position the contacts B1 and E1, FIGURE 1, are open so that no power is applied to the motor 10 and the two magnetic brakes 13 and 14 are set. When the operator moves the control 52 to the first hoisting point the contacts 53 close and the normally closed contacts 55, 58 and 59 open. This action picks up the coil B through the closed contacts 53 and the normally closed contacts C1 and E2. When the coil B is energized power is applied to the motor 10 through the closed contacts B1 and current flows through a conductor 66, FIGURE 2, the closed contacts B4, the normally closed contacts C6, and the coil J, which closes the contacts J1 in the network 12, FIGURE 1. At this point the resistors 33 and 34 are shorted out and approximately 60–70% of the torque available from the motor 10 is applied. The control circuit includes two lockout circuits which prevent the contacts B1 and E1 from closing simultaneously, which would short out the power supply. The contacts B3 in series with the coil E open when the coil B is energized and the contacts E2 in series with the coil B open when the coil E is energized, so that both coils B and E cannot be energized simultaneously.

If a light load is on the hook it is lifted but if a heavy load is on, a greater amount of torque is required and the control 52 must be moved to the second hoisting point. Here the contacts 59 are closed and curret flows through the closed contacts B5 and picks up the coil K, closing the contacts K1 in the network 12 and shorting out the resistors 35, which increases the torque output of the motor 10.

In addition to energizing coil K the connection through the contacts 59 and B5 also energizes the coil L of a timing relay. A predetermined time later the normally open contacts L1 are closed and, if the operator moves the control 52 to the third point hoist, the coil M will be picked up. The contacts M1 then close and short out the resistors 36, which increases the torque output from the motor 10, and the contacts M2 close and pick up the coil N of a second timing relay. A predetermined time later the contacts N1 close and pick up the coil O which automatically shorts out the resistors 37 and accelerates the motor 10 even further.

When coil O is energized the normally open contacts O2 are also closed so that current flows through the conductor 69 and the coil P of a third timing relay. Shortly thereafter the normally open contacts P1 of this relay close and the coil Q is energized which closes the contacts Q1, FIGURE 1, and shorts out all of the resistors in the network 12 except the resistors 39. This is, of course, the maximum speed and torque position of the motor 10 in the hoisting direction. The motor will continue to operate at this speed until either the operator manually returns the control 52 to a lower point or until the hook rises to a level where the limit switches 19 and 20 are opened. When the limit switches are open, power is disconnected from the motor 10 and the motor and load come to a rapid stop due to the setting of the brakes 13 and 14.

If desired, a limit switch can be positioned in series with the contacts 53 and the coil B, FIGURE 2, so that when the hook and load reach this upper limit it will be open and deenergize the coil B. The use of limit switches connected in the power circuit as shown is preferred however.

Whether or not the crane hook will lower and the rate at which it will lower depends on the position of the control 52, the condition of the speed sensitive switch 15, and the amount of load on the hook. Due to the efficiency of the entire crane unit, usually around 85% less retarding torque is required to lower a given load than is required to raise the same load. When the control 52 is turned to the first point lower from the neutral position, the coil C is picked up through the closed contacts 54 and the normally closed contacts H2 and A1. When the coil C is energized, the normally open contacts C2 are closed and the coil B is picked up through the contacts 54, R1, C2 and E2, and a holding circuit for the coil C is also closed through the normally closed contacts A2 and the closed contacts C3 and A1.

Simultaneously, the coil H is picked up through the closed contacts 57, the closed contacts C5 and the normally closed contacts E3 and G4. A holding circuit for the coil H is also closed when coil H is energized through the closed contacts H3 which are connected in parallel with the contacts C5. With the coils B and H both energized the coil E is made unavailable because the normally closed contacts B3 open, and the contacts B1, FIGURE 1, close and power is connected to the primary winding 10a of the motor 10. Also, the normally open contacts H1, FIGURE 1, are closed due to the energization of the coil H and all of the resistors in the network 12 are connected in the rotor winding 10b except the resistors 33 which are shorted out. The values of the resistors are preferably chosen so that motor 10 will exert approximately 36% of its maximum hoisting torque at this setting.

With approximately 36% of the maximum torque available being applied when the contacts H1 are closed the motor 10 will tend to hoist if not otherwise prevented if a light load is on the hook, but, if the load is somewhat greater, the hook will lower instead. With a heavy load on the hook it will, of course, tend to lower more rapidly and it is necessary to close the contacts J1 in order to short out more resistors and slow the motion down. This is accomplished automatically by the speed sensitive switch 62 which opens and deenergizes the coil S when the motor 10 speed rises above approximately 10% of its rated operating speed. With coil S deenergized the coil J is picked up through the normally closed contacts S6 and the closed contacts 58, causing the contacts J1, FIGURE 1, to close and short out the resistors 34. This enables the motor 10 to apply greater torque and slow the heavy load down. When the lowering speed has slowed sufficiently, the speed sensitive switch 62 again closes and energizes the coil S which drops out the coil J. The contacts H1 are still closed, however, and the speed of the motor again increases until the speed sensitive switch 62 causes the contacts J1 to close again. It can be seen, therefore, that the rate of descent is conrolled automatically with a heavy load since the operator is required only to place the control 52 in the first point lower.

If a light load is on the hook it might not lower at all at the first point lower and might tend to be hoisted. To prevent hoisting of a light load when the master switch is in a lower point the frequency sensitive circuit 45, FIGURE 1, responds to the standstill condition by energizing the coil A which opens the normally closed contacts A2, FIGURE 2, and drops out the coil C, which in turn opens up the contacts C2 and deenergizes the coil B. The contacts B1 open and power is automatically disconnected from the motor 10 and the magnetic brakes 13 and 14 automatically set.

The operator then realizes that the load on the hook is too ilght for first point lowering and he moves the control 52 to the second point lowering. The coil C is again energized through the contacts 54, the normally closed contacts H2 and the switch S1. With coil C energized, power is again applied to the motor 10 since the coil B is also energized through contacts 54, R1, C2 and E2 and the contacts B1, FIGURE 1, are closed. The contacts H1 are open and the contacts D1 are normally closed, so that all of the resistors 33–37 are in the circuit. The values of the resistors 33–37 are in the circuit. The values of the resistors are preferably chosen so that in the circumstances approximately 17% of the rated torque is applied by the motor 10 and a light load will lower gradually.

If the load is heavy enough to cause the hook to lower at a speed in excess of 10% of its rated speed, the speed sensitive switch 62 opens and the contacts S5 is series with the coil H close, causing the contacts H1 in the network 12 to close and take out some resistance. The operation then continues as described for point one lowering.

For the motor 10 to apply a smaller degree of hoisting torque in order to lower a still lighter load, the contacts D1 must be opened by energizing the coil D in order to place an infinite amount of resistance in the rotor circuit 10b. This is accomplished by turning the control to the third point lower, so that the coil F of a timing relay is energized through the closed contacts 56, T1 and S4. It will be recalled that the contacts T1 and S4 are closed at low speeds and the contacts T1 are closed while the motor is operating below its maximum safe speed. A predetermined time after the coil F has been energized the contacts F1 connected in series with the coil G close, and the contacts G3 connected in series with the contacts T1 and F1 form a holding circuit for the coil G. The coil D is then picked up through the closed contacts 54, G2 and S3, with the result that the contacts D1 open and the network 12 represents an infinite impedance in the rotor winding 10b and minimum hoisting torque is applied.

However, the circuit contains means for preventing the contacts D1 from opening if the load is too heavy even though the operator turns the control 52 to the third point lower. When the control is initially turned to this third point the load must be light enough so that the speed sensitive switch S4 will remain closed long enough for the contacts F1 of the timing relay to close. If the load is too heavy the contacts S4 will open and the coil F of the timing relay will be deenergized so that the coils G and D cannot be picked up. Therefore, this circuit acts like a "weighing" circuit that relates time to torque. Once the circuit determines that the load on the hook is light enough to make the third point lower position safe, the coil G is picked up which in turn allows the coil D to be energized and open the contacts D1. If the load is heavy enough to cause the hook to lower at a speed in excess of 10% of its rated speed, the speed sensitive switch 62 opens and the contacts S3 in series with the coil D open, causing the contacts D1 to close and increase motor torque by allowing current to flow through the rotor and the network 12. The operation then continues as described generally for the first and second points lowering.

If for any reason the speed of the motor rises above its safe operating speed, the switch 63 opens, deenergizing the coil T, which closes the contacts T2 and picks up the coil J. The resistors 33 and 34 are then shorted out and considerable torque is exerted. This prevents excessive speeds even under severe overload conditions.

If desired, this circuit can be modified by eliminating the second lowering point, leaving only three points. In this modified scheme when the control is turned to the intermediate lowering point the circuit will operate in the manner above described with regard to point two lowering but, depending on load conditions, the circuit may automatically convert to the above described point three lowering as explained.

Point four lowering is power lowering, and is applied when there is little or no load on the hook. When the control 52 is turned to this point it is necessary to close all of the contacts in the network 12 as rapidly as possible, which is accomplished by energizing the coil R through the contacts 61. Contacts R1, connected in series with the contacts 54 and the coil B, open and make the coil B unavailable, and the contacts R2, connected in the line 64, close and pick up the coil E. The motor 10 is accordingly energized in the opposite direction when the contacts E1 close. The normally open contacts R3 connected in the line 67 close and pick up the coils K and L, the coil L being for a timing relay, and close the contacts K1 in the network 12, FIGURE 1. The normally open contacts L1 of the timing relay are closed shortly thereafter with the result that the coil M is picked up through the contacts R4 and L1. The contacts M2 connected in series with the coil N of another timing relay then close and shortly thereafter the coil O is picked up when the contacts N1 of this timing relay close. The coil P of a third timing relay and the coil Q also close in succession. As the coils K, M, O and Q are energized, their contacts in the network 12 close and short out more resistors. Finally, only the resistors 39 remain in the rotor circuit of the motor 10.

A circuit is also provided which delays the setting of the two magnetic brakes and reduces brake lining wear when the hook and load are being lowered and the control is turned to the neutral position. This is accomplished by the circuit through the contacts 55, which are closed at the neutral position, and the closed contacts S2, C4, A2, C3, A1 and the coil C. The contacts C3 and C4 are closed since the control 52 was previously at the first point lower where the coil C is energized. With the coil C maintained energized the coil B is also energized through R1, C2 and E2 and the coil K is picked up through the closed contacts 59 and B5. Accordingly, power is maintained to the motor 10 through the close contacts B1 and the contacts K1 in the network 12 are closed with the result that the motor 10 applies a very substantial braking torque thereby causing a rapid slowdown. As soon as the speed sensitive switch 62 closes it picks up the coil S and opens up the contacts S2 between the contacts 55 and the coils B and C. The result is that the contacts B1 open and the power to the motor 10 is disconnected and the magnetic brakes 13 and 14 are set after the speed of the motor is sufficiently reduced.

It is apparent that a novel and useful control circuit for a wound rotor induction motor has been provided. This circuit takes advantage of low cost speed sensing device to give a control that is capable of automatically detecting the degree of loading on a crane hook. The circuit provides safe and reliable handling of all loads within the capacity of the crane at stable subsynchronous speeds of the motor and is capable of providing the same, relatively low landing speed for all loads. The circuit also includes a safety feature in that any failure in the speed sensing network, which includes the switches 62 and relay coils S and T, will establish through the contacts of relay coils S and T circuits that result in a reduction rather than an increase in the lowering speed.

Suitable fuses, overload relays, master switches, etc., can be installed in the system if desired in a conventional manner by those skilled in the art.

I claim as my invention:

1. In a control circuit for a wound rotor hoisting drive motor having primary and secondary windings, control means having a plurality of positions including at least one hoisting position and first and second lowering positions, means operative in said hoisting position for connecting said primary windings to an A.C. line and for connecting resistance means having a first predetermined value in circuit with said secondary windings, means operative in said first lowering position for connecting said primary windings to an A.C. line and for connecting resistance means having a second predetermined value in circuit with said secondary windings, said second predetermined value being substantially greater than said first predetermined value, means operative in said second lowering position for connecting said primary windings to an A.C. line and for connecting resistance means having a third predetermined value in circuit with said secondary windings, said third predetermined value being substantially greater than said second predetermined value, and speed sensitive means responsive to a speed of operation of said motor greater than a certain value and operative in said first lowering position of said control means for reducing the amount of resistance in circuit with said secondary windings to a value equal to said first predetermined value, said speed sensitive means being operative in said second lowering position for reducing the amount of resistance in circuit with said secondary windings to a value equal to said second predetermined value.

2. In a control circuit for a wound rotor hoisting drive motor having primary and secondary windings, contactor means for connecting said primary windings to an A.C. line, first relay means for connecting resistance means having a first predetermined value in circuit with said secondary windings, second relay means for connecting resistance means having a second predetermined value in circuit with said secondary windings, control means having a plurality of positions including at least one hoisting position and at least one lowering position, means operative in said hoisting position of said control means for energizing said contactor means and said first relay means, means operative in said lowering position of said control means for operating said contactor means and said second relay means, and speed sensitive means responsive to a speed of operation of said motor greater than a certain value and operative in said lowering position of said control means for energizing said first relay means to reduce the value of resistance in circuit with said secondary windings to said first predetermined value.

3. In a control circuit for a wound rotor hoisting drive motor having primary and secondary windings, control means having a plurality of positions including at least one hoisting position and at least one lowering position, means operative in said hoisting position for connecting said primary windings to an A.C. line and for connecting resistance means having a first predetermined value in circuit with said secondary windings, means operative in said lowering position for connecting said primary windings to an A.C. line and for connecting resistance means having a second predetermined value in circuit with said secondary windings, said second predetermined value being substantially greater than said first predetermined value, speed sensitive means responsive to a speed of operation of said motor greater than a certain speed and operative in said lowering position of said control means for reducing the amount of resistance in circuit with said secondary windings to a value substantially less than said second predetermined value, said certain speed being a fraction of the rated operating speed of said motor, and additional speed sensitive means responsive to a speed of operation of said motor substantially greater than said certain speed and operative in said lowering position of said control means for further reducing the amount of resistance in circuit with said secondary windings.

References Cited by the Examiner

UNITED STATES PATENTS

| | | | |
|---|---|---|---|
| 876,993 | 1/08 | Pauly | 318—325 |
| 1,807,143 | 5/31 | Angerstein | 318—240 X |
| 2,246,803 | 6/41 | Lee | 318—325 |
| 2,832,024 | 4/58 | Wickerham | 318—240 X |

ORIS L. RADER, *Primary Examiner.*

JOHN F. COUCH, *Examiner.*